United States Patent
Garrepalli et al.

(10) Patent No.: US 12,542,669 B2
(45) Date of Patent: Feb. 3, 2026

(54) SYSTEMS AND METHODS FOR IMPROVING SECURITY IN NETWORK ENVIRONMENTS

(71) Applicant: Capital One Services, LLC, McLean, VA (US)

(72) Inventors: Suman Garrepalli, McLean, VA (US); David Harrington, Gibsonia, PA (US); William Graf, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 183 days.

(21) Appl. No.: 18/442,065

(22) Filed: Feb. 14, 2024

(65) Prior Publication Data
US 2025/0260573 A1    Aug. 14, 2025

(51) Int. Cl.
*H04L 9/32*    (2006.01)
(52) U.S. Cl.
CPC .................... *H04L 9/3213* (2013.01)
(58) Field of Classification Search
CPC ..................................................... H04L 9/3213
See application file for complete search history.

(56) References Cited

U.S. PATENT DOCUMENTS

| | | | | |
|---|---|---|---|---|
| 10,609,077 B1* | 3/2020 | Mehr | ...................... | H04L 63/08 |
| 2012/0275600 A1* | 11/2012 | Arnold | ...................... | H04L 9/08 |
| | | | | 380/277 |
| 2023/0275893 A1* | 8/2023 | Sharma | ............... | H04L 63/0807 |
| | | | | 726/9 |

* cited by examiner

*Primary Examiner* — Henry Tsang
(74) *Attorney, Agent, or Firm* — Foley & Lardner LLP

(57) ABSTRACT

Systems and methods are described herein for improving security in network environments by dynamically generating access credentials off-line that are resilient to impersonation attempts. For example, the system may receive, at a local token service, a first external request from a remote token service for a first dynamically generated token. The system may retrieve, at the local token service, a first token template for the remote token service. The system may, based on the first token template, select a first object-based storage device and a second object-based storage device. The system may transmit, by the local token service, a first internal request to the first object-based storage device and a second internal request to the second object-based storage device. The system may populate the first token template with the first token portion and the second token portion to generate the first dynamically generated token.

20 Claims, 4 Drawing Sheets

```
200
{
    "Effect": "Allow",          ← 202
    "Action": [
        "s3:GetObject"
    ],                          ← 204
    "Resource": [
        "arn:aws:s3:::{{bucket}}/{{tenant}}/*"   ← 206
    ]
}
```

FIG. 2

SYSTEMS AND METHODS FOR IMPROVING SECURITY IN NETWORK ENVIRONMENTS

BACKGROUND

Access tokens are a type of security credential used in authentication and authorization processes, especially in the context of computer systems and web services. They are typically used to prove the identity of a user or system and provide permission to access specific resources or perform certain actions. Access tokens play a crucial role in maintaining the security and privacy of data and services, particularly in the realm of web applications and cloud-based resources. Cloud resources, also known as cloud computing resources or cloud services, refer to the various components and capabilities offered by cloud service providers within a cloud computing environment. Cloud resources are hosted and delivered over the internet, and they enable organizations and individuals to access and utilize a wide range of computing, storage, networking, and software services without the need to own or manage physical infrastructure.

However, access tokens can have various technical problems or vulnerabilities if not implemented and managed correctly. These problems can potentially compromise the security of systems and the confidentiality, integrity, and availability of data.

SUMMARY

Systems and methods are described herein for novel uses and/or improvements to access token generation. More specifically, systems and methods are described for improving security in network environments by dynamically generating access credentials off-line that are resilient to impersonation attempt. For example, one technical problem or vulnerability in access tokens is token leakage. Access tokens can be vulnerable to leakage if they are not properly secured. If an attacker gains access to a token, they may be able to impersonate the legitimate user or application. A conventional approach to this problem is to use a static access token that may be replaced if leakage is detected.

In contrast to this conventional approach, the systems and methods improve security in network environments that use access tokens by dynamically generating access credentials. As the access credentials are dynamically generated, there is no risk of leakage as with a static access token. However, even dynamically generating an access credential (e.g., a temporary access credential), does not fully absolve the access credential from being subject to an impersonation attack (e.g., an attacker may request a temporary access credential).

In view of this, the systems and methods dynamically generate access credentials off-line. By doing so, the systems and methods may implement more robust security protocols to generate the access credentials. In particular, the systems and methods may use a token template that may be specific to each external request (e.g., a token template that mandates a specific user, function, time period, etc.). The system may then transmit internal requests to a plurality of object-based storage devices selected by the token template that request a contribution from each of the devices to populate a token template. By requiring multiple contributions, and by requesting contributions that are both specific to the external request and the token template, the risk of leakage is limited to only the specific user, function, time period, etc., but also, by requiring the token template to select the devices contributing to the dynamically generating access credentials, the contributions are secured beyond normal token-based security. For example, the token template may be designed to accept inputs from two separate devices, in which each device provides a unique input, and these inputs are combined or processed according to the template to generate the authentication token the access credentials. By doing so, even if one device or request is comprised, the access credentials can still not be impersonated.

In some aspects, systems and methods are described herein for improving security in network environments by dynamically generating access credentials off-line that are resilient to impersonation attempts. For example, the system may receive, at a local token service, a first external request from a remote token service for a first dynamically generated token. The system may retrieve, at the local token service, a first token template for the remote token service. The system may, based on the first token template, select a first object-based storage device and a second object-based storage device. The system may transmit, by the local token service, a first internal request to the first object-based storage device and a second internal request to the second object-based storage device. The system may receive, from the first object-based storage device, a first internal response, wherein the first internal response comprises a first token portion. The system may receive, from the second object-based storage device, a second internal response, wherein the second internal response comprises a second token portion. The system may populate the first token template with the first token portion and the second token portion to generate the first dynamically generated token.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 shows an illustrative diagram for requests for dynamically generating access credentials, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
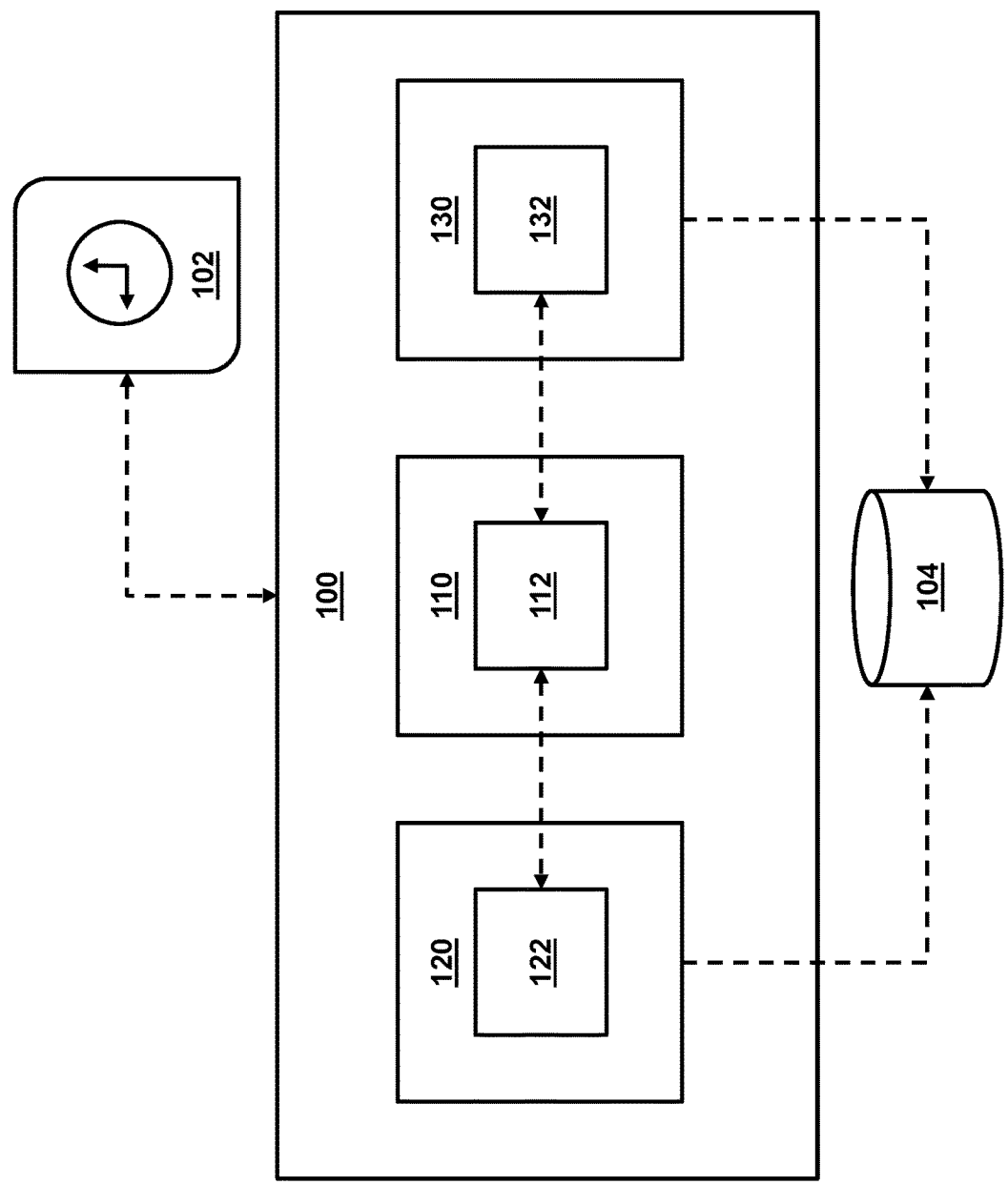
FIG. 1 shows an illustrative diagram for improving security in network environments, in accordance with one or more embodiments.

FIG. 1 shows an illustrative diagram for improving security in network environments, in accordance with one or more embodiments. For example, internal device 100 may be used to improve security in network environments by dynamically generating access credentials off-line that are resilient to impersonation attempts. For example, FIG. 1 may show a network environment between internal device 100 and external device 102. The network environment may be the collective set of interconnected devices, systems, and resources that enable communication, data sharing, and the exchange of information within a specific location or across various locations. In one embodiment, internal device 100 may refer to a first network (e.g., a cloud network) and external device 102 may refer to a second network (e.g., a second cloud network). FIG. 1 also includes a shared object store (e.g., stored object store 104) that may be accessed by device 120 and/or device 130 for a processing job (e.g., job 122 and/or job 132).

In some embodiments, internal device 100 and external device 102 may comprise an object-based storage device, which may be a type of data storage system designed to store and manage data as discrete, individually addressable objects, rather than using traditional block or file-based storage. In object-based storage, each piece of data is stored with a unique identifier and metadata, making it highly suitable for managing unstructured data, such as multimedia files, documents, and web content.

In object-based storage, data may be organized as objects, each with its unique identifier (often called an Object ID), metadata, and data payload. This contrasts with block storage (used in traditional hard drives) and file-based storage (used in network-attached storage or file servers). Object-based storage is highly scalable, allowing organizations to add more storage capacity by simply adding more hardware. It is well-suited for managing large datasets, and as data grows, additional storage nodes can be easily integrated into the system.

In some embodiments, external device 102 may be an external token service. An external token service, in the context of authentication and authorization, may refer to a service or system that is responsible for generating, validating, and managing access tokens for use in securing applications, services, or resources. These external token services are often used in distributed systems, cloud computing, and microservices architectures to handle the authentication and authorization aspects of a system, allowing applications to delegate these responsibilities to a dedicated service.

An external token service may generate access tokens, which are used to verify the identity of clients (such as applications or users) and grant them access to specific resources or services. These tokens are often short-lived and include information about the user, the client, and the permissions or scopes associated with the token. The external token service may handle both authentication (verifying the identity of the user or client) and authorization (determining what resources or actions the user or client is allowed to access). It may integrate with various identity providers and authorization mechanisms. Different external token services may support various token types, such as JSON Web Tokens (JWTs), OAuth 2.0 tokens, or SAML (Security Assertion Markup Language) tokens, depending on the specific use case and requirements of the system.

External token services may be used in Single Sign-On (SSO) solutions, allowing users to log in once and access multiple applications or services without the need to re-enter their credentials. External token services can be integrated into various applications and services (e.g., internal device 100) using standard protocols and APIs. Popular protocols like OAuth 2.0 and OpenID Connect are commonly used for this purpose. In some cases, external token services support token exchange mechanisms, allowing one type of token to be exchanged for another. This can be useful in scenarios where a client needs to request a different type of token for specific interactions.

In some embodiments, internal device 100 may represent its own token service. For example, internal device 100 may receive, as a local token service, a first external request from a remote token service (e.g., external device 102) for a first dynamically generated token. In some embodiments, internal device 100 may comprise a local token service that uses a Kubernetes cluster. A Kubernetes cluster is a group of interconnected machines (physical or virtual) that work together to manage and orchestrate containerized applications. Kubernetes is an open source container orchestration platform, and a cluster is the fundamental infrastructure on which Kubernetes operates. It provides the necessary resources and environment for deploying, scaling, and managing containerized applications efficiently.

Internal device 100 may retrieve, using a dynamic access token application programming interface at a local token service (e.g., local service 110), a first token template for the remote token service. Local service 110 may host API 112. An API (Application Programming Interface) for a token service, also known as a Token API, may be a set of rules and protocols that allows applications, services, or systems to interact with the token service to request, generate, validate, and manage access tokens. These APIs are integral to the authentication and authorization process in modern software systems, enabling secure and controlled access to resources.

Applications or clients (e.g., external device 102) can use the Token API to request access tokens. This request typically includes information such as the client's identity, the user's identity (if applicable), and the requested scopes or permissions. The Token API may generate access tokens based on the provided information and any applicable authentication and authorization checks. These tokens are often in the form of JWTs, OAuth tokens, or other token formats. Applications and resource servers can use the Token API to validate received tokens. The API checks the token's authenticity, expiration, and associated permissions to ensure that the token is valid for a specific request. The Token API may offer endpoints for revoking or invalidating access tokens. This is crucial for security and compliance, allowing the token service to terminate tokens when necessary, such as when a user logs out or when access rights change. The Token API may provide the ability to refresh or renew access tokens without requiring the user to re-authenticate. This can be initiated through the Token API. The Token API may offer introspection endpoints that allow resource servers to query the token service to obtain information about a token, such as its scopes and the user it represents.

For systems that provide user authentication, the Token API can handle user login, registration, and authentication flows, returning access tokens upon successful authentication. The API may allow the configuration and management of scopes and permissions, enabling fine-grained control over what actions or resources a token can access. Some Token APIs support client registration, allowing applications to register themselves with the token service and obtain the necessary credentials and permissions for accessing resources. Token APIs often support the configuration of token issuance policies, including token expiration periods, token formats, and token lifetimes. The Token API may support various authentication mechanisms, such as username and password, OAuth 2.0, OpenID Connect, and more, depending on the use case and security requirements.

API 112 may retrieve and/or manage a token template. A token template may be a predefined structure or format used to generate and validate security tokens. The token template may define the type of security token, such as JWT, OAuth 2.0 token, SAML token, or other token formats. Each token type may have its own structure and data format. Claims are pieces of information contained within the token that represent attributes about the user or client. The token template specifies the required and optional claims, such as user ID, role, and expiration time. Claims may be used for various purposes, including user identification and authorization. The template may define the structure and encoding of the token, including the use of headers, payload, and digital signatures or encryption. For example, a JWT typically includes a header, payload, and signature section. The template may outline the rules and requirements for generating and validating tokens. This includes defining the conditions under which a token can be issued and the criteria for token validation, such as verifying digital signatures or checking expiration times. If the token template is used in an OAuth 2.0 context, it may define the scopes and permissions that can be associated with the token, specifying what resources or actions the token holder is authorized to access. The template may specify the cryptographic algorithms and security measures used to secure the token, such as HMAC (Hash-based Message Authentication Code), RSA (Rivest-Shamir-Adleman), or ECDSA (Elliptic Curve Digital Signature Algorithm).

In some embodiments, based on the first token template, the system may select, using the dynamic access token application programming interface, a first object-based storage device and a second object-based storage device, wherein the first object-based storage device and the second object-based storage device share a common object store. For example, internal device 100 may have access to a plurality of object-based storage devices (e.g., device 120 and device 130). Each of the plurality of object-based storage devices may also use specific functions, data sources, and/or role approvals.

For example, API 112 may transmit a first internal request to the first object-based storage device (e.g., device 120) and a second internal request to the second object-based storage device (e.g., device 130). The system may then receive, from the first object-based storage device, a first internal response, wherein the first internal response comprises a first token portion. The system may also receive, from the second object-based storage device, a second internal response, wherein the second internal response comprises a second token portion. A token portion may be a part or segment of a larger token, code, or data structure. For example, in programming, a token can refer to a lexical unit, such as a keyword or symbol, in a programming language. A token portion in this context might be a subset of the code that represents a specific part of the program.

API 112 may then populate the first token template with the first token portion and the second token portion to generate the first dynamically generated token and transmit a first external response to the remote token service comprising the first dynamically generated token. The first dynamically generated token may then be used by external device 102 to access a system and/or user interface. As referred to herein, a "user interface" may comprise a human-computer interaction and communication in a device, and may include display screens, keyboards, a mouse, and the appearance of a desktop. For example, a user interface may comprise a way a user interacts with an application or a website.

As referred to herein, "content" should be understood to mean an electronically consumable user asset, such as internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

In some embodiments, the dynamically generated token may comprise time-series data. As described herein, "time-series data" may include a sequence of data points that occur in successive order over some period of time and/or may have a temporal component (e.g., a given expiration date). In some embodiments, time-series data may be contrasted with cross-sectional data, which captures a point-in-time (e.g., static access credentials). A dynamically generated token based on a time series can be taken on any variable that changes over time. The system may use a time series to track the variable (e.g., access) to a data source over time.

FIG. 2 shows an illustrative diagram for requests for dynamically generating access credentials, in accordance with one or more embodiments. For example, request 200 may be used to improve security in network environments by dynamically generating access credentials off-line that are resilient to impersonation attempts. FIG. 2 may illustrate a request (e.g., an internal request) to an object-based storage device. For example, request 200 may include various types of identifier information.

Including identifier information within an internal request to an object-based storage device serves several important purposes, primarily related to data management, access control, and organization within a computer system or application. For example, internal requests to object-based storage devices may include retrieving specific data objects or resources. The identifier information helps the storage system locate and fetch the correct data object, ensuring that the requested information is obtained accurately.

Request 200 may also include identifier information used to enforce access control and security policies. By including user or system identifiers in internal requests, the storage device can verify that the requestor has the appropriate permissions to access the data. This helps protect sensitive or restricted information from unauthorized access. Additionally or alternatively, identifier information can assist in resource management and tracking. It helps the storage system monitor resource usage, audit data access, and maintain records of which users or components are interacting with specific data objects. This can be crucial for resource allocation, monitoring, and accountability.

Request 200 may also include object-oriented storage systems that use identifier information to organize and categorize data. This enables efficient indexing and searching, making it easier to locate and manage data objects. For example, a unique identifier might be associated with each user's data to ensure proper data segregation.

In some embodiments, identifier information can be used to track different versions or revisions of data objects. This is important for data integrity, version control, and ensuring that the correct version of a data object is retrieved or modified. Additionally or alternatively, identifier information can be used to manage caching and reduce redundant data retrieval. By including an identifier, the storage device can check whether the requested data is already in a cache and deliver it more quickly, reducing the load on the storage system.

When multiple users or components are working with the same data, identifier information can help resolve conflicts. By uniquely identifying each request, the system can determine the order in which changes were made and ensure that modifications do not lead to data inconsistency. In collaborative environments or distributed systems, identifier information can help facilitate data sharing. Users or components may include their identifiers to request access to shared data, which the storage system can then verify and manage accordingly. Identifier information is also useful for tracking data ownership and attributing data modifications to specific users or applications. This is important for accountability and auditing.

For example, request 200 may include job identifier 202, data requirement 204, and object-based storage device identifier 206. The job identifier may indicate what action, effect, and/or task the access credential is being used for (and/or include a respective identifier for such access credential). For example, job identifier 202 may be used to specify and define the intended access and permissions associated with the requested credentials. The action identifier may define the specific action or operation that a user or entity is requesting permission to perform. It specifies what the user intends to do once granted access. For example, in a request for an access credential, the action identifier might indicate actions like "read," "write," "delete," "create," "execute," or other specific actions depending on the context of the access control system. These identifiers help ensure that users are granted the appropriate level of access based on the actions they need to perform.

The effect identifier may describe the outcome or effect of the requested action. It indicates what will happen if the requested access is granted. For instance, in the context of a request for an access credential, the effect identifier might specify effects like "allow," "deny," "permit," "restrict," "audit," or "block." The effect identifier helps determine the result of granting or denying access based on the requested action.

The task identifier may represent a higher-level or more abstract description of the operation or task that the user or entity is requesting access to perform. It provides context to the requested access and helps align access requests with organizational goals and processes. For example, a task identifier might indicate tasks like "data backup," "financial reporting," "system administration," or "customer support." Task identifiers are used to ensure that access requests are in line with the overall objectives and roles within an organization.

These identifiers may help define and clarify access requests, making it easier to grant or deny access in a structured and secure manner. By specifying the action, effect, and task associated with the requested access, organizations can implement more fine-grained and context-aware access control, thereby improving security and compliance.

The data requirement 204 may indicate what data is required to generate the access credential and/or what data should be used to generate the credential. The data required to generate an access credential, as well as the data that should be used to generate the credential, can vary depending on the context, the specific system or application, and the security requirements. Access credentials, such as access tokens, badges, or authentication keys, may be generated based on various types of information (e.g., as defined by the token template). For example, the template may specify the use of a user identity, authentication data, authorization information, token type, time periods and/or dates, other unique identifiers, other metadata, contextual data, signatures, consent data, and/or other data.

For example, the user's identity is a fundamental piece of information used to generate an access credential. This may include the user's username, email address, employee ID, or a unique identifier. The user's identity is often used to link the access credential to a specific user. To ensure the validity of the access credential, authentication data may be required. This data may include a password, biometric information (e.g., fingerprint or retina scan), a PIN, or a cryptographic key. The user must prove their identity through authentication before receiving the credential.

Authorization data may specify the permissions and access rights associated with the credential. This information defines what the credential holder is allowed to do or access. It may include role assignments, access policies, and specific permissions (e.g., read, write, delete). Depending on the system or application, the type of access credential (e.g., OAuth 2.0 token, API key, digital certificate, badge) may need to be specified. Different types of credentials have different structures and formats.

Many access credentials have an expiration date and time to ensure that they are not valid indefinitely. This helps improve security by limiting the window of opportunity for unauthorized access. An access credential may also include a unique identifier, which distinguishes it from other credentials. This identifier can be used for tracking and auditing purposes. Depending on the use case, additional metadata may be included in the access credential. This could involve information about the issuer, the purpose of the credential, and the associated resource or service.

In some cases, access credentials are digitally signed or encrypted to enhance security and prevent tampering. Cryptographic keys are used to create and verify these signatures. The context in which the access credential is issued or used may be considered. For example, the location, time, and conditions under which the credential is presented can be factors in determining its validity. User consent and additional user attributes may be part of the credential-generation process, especially in scenarios involving user-centric authentication. The data required to generate an access credential may be aligned by the template with the security and access control policies of the organization or system in question.

Figure 3:
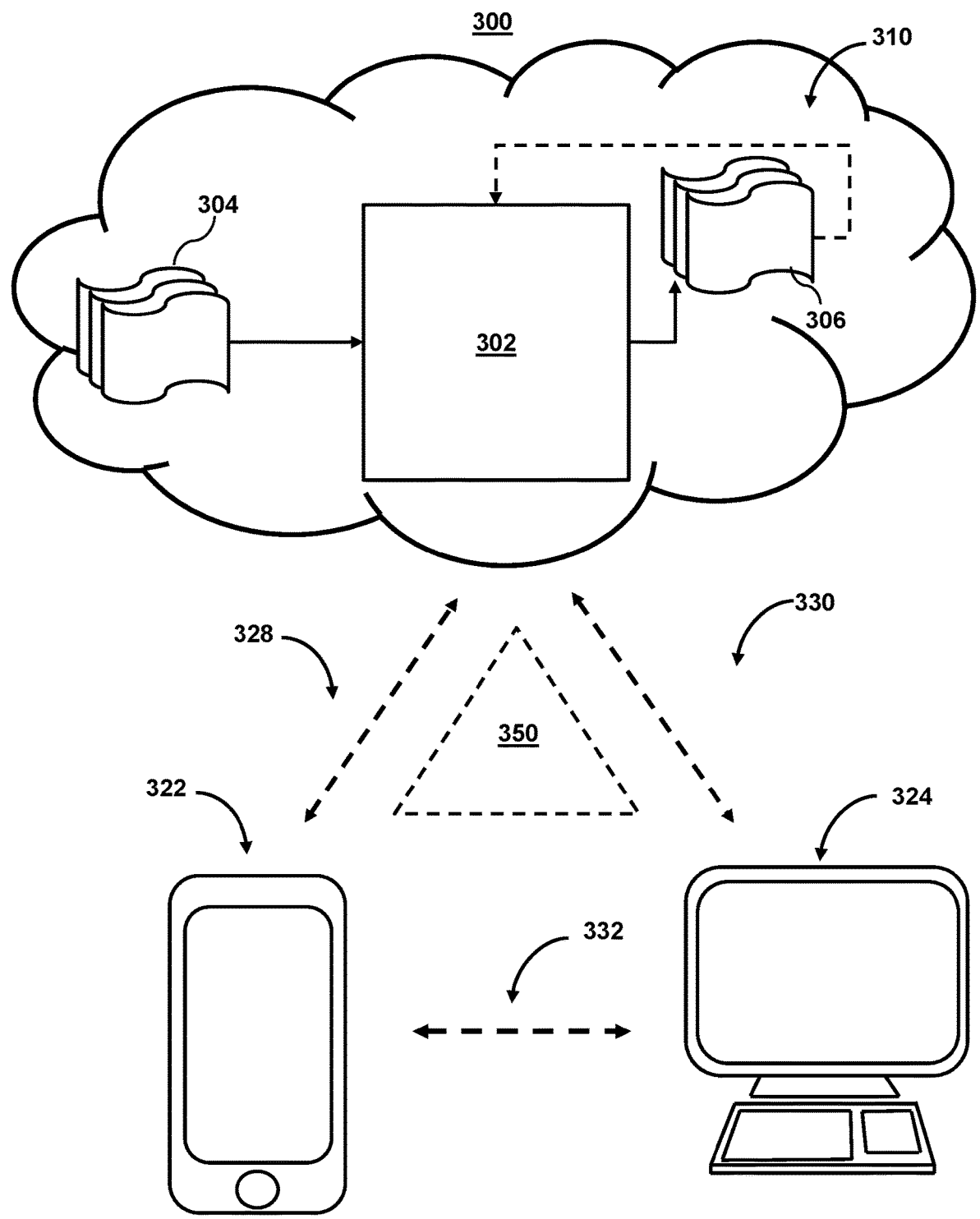
FIG. 3 shows illustrative components for a system used to dynamically generate access credentials, in accordance with one or more embodiments.

FIG. 3 shows illustrative components for a system used to dynamically generate access credentials, in accordance with one or more embodiments. For example, system 300 may be used to improve security in network environments by dynamically generating access credentials off-line that are resilient to impersonation attempts. For example, FIG. 3 may show illustrative components for improving security in network environments by dynamically generating access credentials off-line that are resilient to impersonation attempt. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred to collectively as "models" herein). Artificial intelligence may include, but is not limited to, machine learning, deep learning, etc. Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a generated token, internal request, selected device for generating a token, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free flowing, with connections interacting in a more chaotic and complex fashion. During testing, an output layer of model 302 may indicate whether or not a given input corresponds to a classification of model 302 (e.g., a generated token, internal request, selected device for generating a token, etc.).

In some embodiments, the model (e.g., model 302) may automatically perform actions based on outputs 306. In some embodiments, the model (e.g., model 302) may not perform any actions. The output of the model (e.g., model 302) may be used to dynamically generate access credentials.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
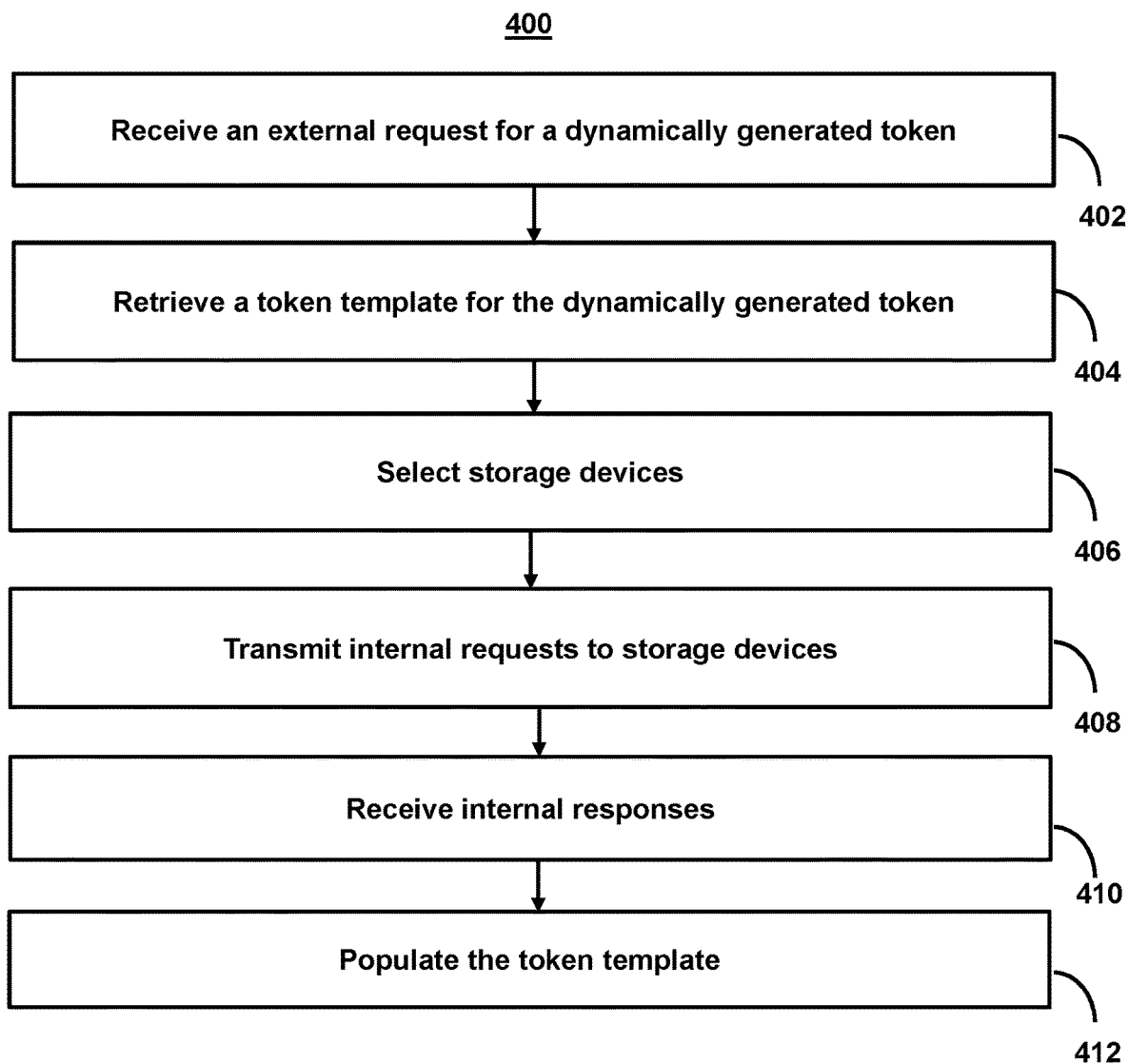
FIG. 4 shows a flowchart of the steps involved in dynamically generating access credentials, in accordance with one or more embodiments.

FIG. 4 shows a flowchart of the steps involved in dynamically generating access credentials, in accordance with one or more embodiments. For example, process 400 may be used to improve security in network environments by dynamically generating access credentials off-line that are resilient to impersonation attempts.

At step 402, process 400 (e.g., using one or more components described above) receives an external request for a dynamically generated token. For example, the system may receive, at a local token service, a first external request from a remote token service for a first dynamically generated token. For example, the system may send a request from one object-oriented storage bucket to another (e.g., to generate and/or receive the external request) using SDKs (Software Development Kits) for various programming languages. These SDKs may provide methods for making requests to object-oriented storage buckets, including copying, moving, or retrieving objects. Additionally or alternatively, the system may use Lambda functions that are triggered by events, such as new object uploads, in a source bucket. These functions can be programmed to copy or move objects from the source bucket to the destination bucket.

At step 404, process 400 (e.g., using one or more components described above) retrieves a token template for the dynamically generated token. For example, the system may retrieve, at the local token service, a first token template for the remote token service. The generation and storage of a plurality of token templates for dynamically generating access credentials and tokens may involve various software and data management practices. Token templates may be managed within an identity and access management (IAM) system or an authentication and authorization service. The system may design token templates. For example, the system may define the structure and format of access tokens or credentials that the system or application will use. The system may determine the token type (e.g., JWT, OAuth token), required claims, and any specific metadata or settings.

The system may develop a set of template files or configuration data that represent each type of token that the system needs to generate. These templates define the content and structure of tokens, including claims, expiration times, and other properties. The system may also store these token templates in a secure location. This can be a database, file system, or a dedicated configuration store within your IAM system. Ensure that access to the templates is restricted to authorized users or components.

When an access token or credential is needed, the system may use a specific template as a blueprint to create a token instance. This involves filling in the template with appropriate data, such as user identity, permissions, and other relevant information. The system may also define a token life cycle management. The token life cycle management may include setting expiration policies and handling token revocation. Tokens may have varying lifetimes, and they should be revoked or refreshed when necessary to maintain security.

The system may define the authorization and validation rules for each token template. This includes specifying who can request tokens of a certain type, what actions those tokens can perform, and which resources they can access. The system may also integrate the token templates with IAM services and access control mechanisms, ensuring that access policies and authentication flows align with the token templates and their rules. The system may implement a versioning system for token templates. As the system evolves, the system may need to update or create new templates. Versioning ensures that tokens generated using older templates remain valid, while new tokens adhere to the latest standards.

The system may enforce strict access control and security measures around the token templates. The system may ensure that only authorized administrators or services can modify or create templates. The system may protect sensitive data, such as encryption keys and secrets, associated with token templates. The system may also implement logging and auditing to track token template changes and token issuance. This is critical for monitoring and ensuring compliance.

At step 406, process 400 (e.g., using one or more components described above) selects storage devices. For example, the system may, based on the first token template, select a first object-based storage device and a second object-based storage device. The selection of a particular object-based storage device for dynamically generating access credentials and tokens in a token service may involve consideration of various factors, and it depends on the specific requirements and architecture of the system. Below are the key considerations and steps involved in this process:

The system may determine which object-based storage devices in the environment will serve as the target for generating access credentials and tokens. This selection may be based on factors like data sensitivity, data volume, and the specific use case. Additionally or alternatively, the system may define the access control configuration for the selected storage device. This involves specifying who can access the data stored in the device and what actions they can perform (e.g., read, write, delete). Additionally or alternatively, the system may ensure that the chosen storage device is compatible with the IAM system and token service. The storage device should support the necessary protocols and authentication mechanisms required by the token service. Additionally or alternatively, the system may elect the appropriate token template for generating access credentials and tokens. The token template should align with the requirements of the storage device and the access control configuration.

At step 408, process 400 (e.g., using one or more components described above) transmits internal requests to storage devices. For example, the system may transmit, by the local token service, a first internal request to the first object-based storage device and a second internal request to the second object-based storage device. When the system or application requests access to data in the storage device, it must authenticate itself to the token service. The token service verifies the identity and permissions of the system or application. Based on the authentication and authorization information, the token service generates an access token or credential using the selected token template. The token service may issue the access token or credential and binds it to the authenticated system or application. The system or application can now use the access token or credential to access the selected object-based storage device. The token is presented along with the request to the storage device.

The object-based storage device may enforce access control rules, which include validating the access token or credential and checking the system's or application's permissions based on the token's claims. If the access token is valid and the permissions check out, the system or application can perform the requested data access operations. Additionally or alternatively, the system may implement logging and auditing mechanisms to track token issuance, usage, and access to the storage device. This is crucial for monitoring and security compliance. Additionally or alternatively, the system may implement token revocation mechanisms to invalidate access tokens when necessary (e.g., when a user system logs out and/or when permissions change). Tokens may also have expiry times to enhance security.

In some embodiments, to select a given object-based storage device, the system may generate and/or modify a given internal response. For example, the system may encode the instructions for the internal response and/or characteristics thereof into the internal request. For example, selecting the first object-based storage device based on the first token template may comprise retrieving a first object-based storage device identifier, first job identifier, first user identifier, first time window, and/or first role for the first object-based storage device. The system may then insert the first object-based storage device identifier, first job identifier, first user identifier, first time window, and/or first role for the first object-based storage device into the first internal request.

At step 410, process 400 (e.g., using one or more components described above) receives internal responses. For example, the system may receive, from the first object-based storage device, a first internal response, wherein the first internal response comprises a first token portion. The system may also receive, from the second object-based storage device, a second internal response, wherein the second internal response comprises a second token portion.

In some embodiments, receiving the first internal response may comprise receiving a first contribution to a multi-party computation, and wherein receiving the second internal response further comprises receiving a second contribution to the multi-party computation. For example, contribution may refer to the input or data provided by a participant in the computation. A multi-party computation (MPC) is a cryptographic protocol that allows multiple parties to jointly compute a function or perform a computation over their private inputs while keeping those inputs confidential. Each participant, often referred to as a "party" in MPC, contributes their private input to the computation without revealing it to the other parties. The contributions are then processed using cryptographic techniques to compute the desired result while preserving privacy. To protect the privacy of the inputs, cryptographic techniques such as secret sharing, homomorphic encryption, or secure function evaluation are used. These techniques ensure that no single party can learn the inputs of others while enabling the joint computation of a function over those inputs. The multi-party computation protocol operates on the shared inputs, allowing the parties to collectively compute a function without directly revealing their individual contributions. After the computation is completed, the parties may collectively reconstruct the final result without any party learning more than what can be inferred from the result itself. This ensures that each party's contribution remains private.

In some embodiments, transmitting the first internal request to the first object-based storage device may comprise the system determining a first bucket name for the first object-based storage device. The system may determine a first object key for a location within the first object-based storage device. For example, a system may use an object key and a bucket name to specify the location of an object within the storage device when transmitting a request. A bucket is a top-level container or namespace in an object-based storage system. Each bucket is uniquely identified by its name within the storage service. When the system wants to access or manipulate data within a bucket, the system may specify the bucket name in the system's request. For example, the system may have a bucket named "my-data." Within each bucket, data is organized using object keys. An object key is a unique identifier for an object stored in the bucket. Object keys are used to retrieve, create, update, or delete specific objects. They are typically represented as strings and should be unique within a bucket. For example, an object key might be "documents/report.pdf."

At step 412, process 400 (e.g., using one or more components described above) populates the token template. For example, the system may populate the first token template with the first token portion and the second token portion to generate the first dynamically generated token. The system may combine token portions received from different object-based storage devices by following a specific process that ensures access control and authorization are maintained while granting access to resources across multiple storage devices. Before combining token portions, the token service must authenticate the system or application that is making the request. This typically involves verifying the system's identity, often through username and password, authentication tokens, or other means. The system or application submits a request to the token service, specifying the resources they want to access. The token service checks whether the user or application is authorized to access these resources. If the authorization check is successful, the token service generates an access token that represents the system's or application's permissions. The access token may include claims or attributes that describe the system's identity, scope of access, and other relevant information.

The system or application may use the access token to make requests to the various object-based storage devices where they want to access resources. Each storage device receives the access token for authorization. Each storage device may validate the access token presented by the system or application. The validation process involves checking the token's signature, expiration, and claims to ensure it is valid and has the necessary permissions.

If the access token is valid and authorizes the requested action on a particular storage device, the storage device allows the system or application to access the requested resources. If the system or application needs to access resources stored on multiple object-based storage devices, the token service may need to combine token portions received from each device. This typically involves aggregating the access rights and claims from each token portion into a single, unified access token.

The token service may coordinate the access to multiple storage devices, ensuring that the user or application can access the necessary resources. This may involve sending multiple requests to different storage devices, each with the appropriate portion of the access token. The token service may combine the results from the various storage devices and generate a response to the system or application. This response typically includes information about the status of each resource access request. The token service may log and audit all access requests, responses, and any actions taken. This information is critical for monitoring and security compliance.

The system may receive a plurality of requests, each corresponding to a different application, dynamically generated token, function, etc. For example, the system may receive a second external request from the remote token service for a second dynamically generated token. The system may retrieve, at the local token service, a second token template for the remote token service. The system may, based on the second token template, select a third object-based storage device and a fourth object-based storage device. The system may transmit a second internal request to the third object-based storage device and a fourth internal request to the fourth object-based storage device. The system may receive, from the third object-based storage device, a third internal response, wherein the third internal response comprises a third token portion. The system may receive, from the fourth object-based storage device, a fourth internal response, wherein the fourth internal response comprises a fourth token portion. The system may then populate the second token template with the third token portion and the fourth token portion to generate the second dynamically generated token.

In some embodiments, populating the first token template with the first token portion and the second token portion to generate the first dynamically generated token may comprise the use of, or the combination of, hash values. A token service can use hash values to generate a token by applying a cryptographic hash function to specific data, such as user information, permissions, a timestamp, or a combination of these elements. The resulting hash value serves as the token.

For example, the token service may collect the relevant data that will be used to generate the token. This data typically includes information related to the user or entity requesting the token, as well as any additional data that should be included in the token (e.g., permissions, claims, or metadata). The collected data is concatenated into a single string or binary format. The order and format of the data elements are predetermined and standardized to ensure consistency. The token service selects a suitable cryptographic hashing algorithm. Common choices include SHA-256, SHA-512, or other secure hash functions. The selection of the hash algorithm depends on the desired security level and hash length. The concatenated data is passed through the chosen hash function, which calculates the hash value based on the input data. The hash function is a one-way process, meaning that it is computationally infeasible to reverse the operation and obtain the original data from the hash value. The output of the hash function is the hash value, which serves as the token. This value is typically a fixed-length sequence of characters (e.g., hexadecimal or base64-encoded). It is unique to the combination of input data. The hash value can be formatted as needed for the specific token type. For example, it may be wrapped in a JSON structure to create a JWT, or it can be included in an OAuth 2.0 access token format. The token service issues the generated token to the user or application that requested it. The token is used as proof of authorization and can be presented to access protected resources or perform certain actions.

In some embodiments, the system may combine different hash values corresponding to different token portions. For example, the system may receive a first hash value in the first internal response, wherein the first hash value is based on hashing a first portion of the first internal request and first data located at the first object-based storage device. The system may then determine the first dynamically generated token based on the first hash value. Additionally or alternatively, the system may receive a second hash value in the second internal response, wherein the second hash value is based on hashing a second portion of the second internal request and second data located at the second object-based storage device. The system may then determine the first dynamically generated token based on hashing the first hash value and the second hash value.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for improving security in network environments by dynamically generating access credentials off-line that are resilient to impersonation attempts.

2. The method of the preceding embodiment, the method comprising:
 receiving, at a local token service, a first external request from a remote token service for a first dynamically generated token; retrieving, at the local token service, a first token template for the remote token service; based on the first token template, selecting a first object-based storage device and a second object-based storage device; transmitting, by the local token service, a first internal request to the first object-based storage device and a second internal request to the second object-based storage device; receiving, from the first object-based storage device, a first internal response, wherein the first internal response comprises a first token portion; receiving, from the second object-based storage device, a second internal response, wherein the second internal response comprises a second token portion; and populating the first token template with the first token portion and the second token portion to generate the first dynamically generated token.

3. The method of any one of the preceding embodiments, the method further comprising: receiving a second external request from the remote token service for a second dynamically generated token; retrieving, at the local token service, a second token template for the remote token service; based on the second token template, selecting a third object-based storage device and a fourth object-based storage device; transmitting a second internal request to the third object-based storage device and a fourth internal request to the fourth object-based storage device; receiving, from the third object-based storage device, a third internal response, wherein the third internal response comprises a third token portion; receiving, from the fourth object-based storage device, a fourth internal response, wherein the fourth internal response comprises a fourth token portion; and populating the second token template with the third token portion and the fourth token portion to generate the second dynamically generated token.

4. The method of any one of the preceding embodiments, wherein selecting the first object-based storage device based on the first token template further comprises: retrieving a first object-based storage device identifier for the first object-based storage device; and inserting the first object-based storage device identifier into the first internal request.

5. The method of any one of the preceding embodiments, wherein selecting the first object-based storage device based on the first token template further comprises: retrieving a first job identifier for the first external request; and inserting the first job identifier into the first internal request.

6. The method of any one of the preceding embodiments, wherein selecting the first object-based storage device based on the first token template further comprises: retrieving a first user identifier for the first external request; and inserting the first user identifier into the first internal request.

7. The method of any one of the preceding embodiments, wherein selecting the first object-based storage device based on the first token template further comprises: retrieving a first time window for the first external request; and inserting the first time window into the first internal request.

8. The method of any one of the preceding embodiments, wherein selecting the first object-based storage device based on the first token template further comprises: retrieving a first role based on the first external request; and inserting the first role into the first internal request.

9. The method of any one of the preceding embodiments, wherein populating the first token template with the first token portion and the second token portion to generate the first dynamically generated token further comprises: receiving a first hash value in the first internal response, wherein the first hash value is based on hashing a first portion of the first internal request and first data located at the first object-based storage device; and determining the first dynamically generated token based on the first hash value.

10. The method of any one of the preceding embodiments, wherein populating the first token template with the first token portion and the second token portion to generate the first dynamically generated token further comprises: receiving a second hash value in the second internal response, wherein the second hash value is based on hashing a second portion of the second internal request and second data located at the second object-based storage device; and determining the first dynamically generated token based on hashing the first hash value and the second hash value.

11. The method of any one of the preceding embodiments, wherein populating the first token template with the first token portion and the second token portion to generate the first dynamically generated token further comprises: retrieving a token protocol from the first token template; and combining the first token portion and the second token portion based on the token protocol.

12. The method of any one of the preceding embodiments, wherein receiving the first internal response further comprises receiving a first contribution to a multi-party computation, and wherein receiving the second internal response further comprises receiving a second contribution to the multi-party computation.

13. The method of any one of the preceding embodiments, wherein transmitting the first internal request to the first object-based storage device further comprises: determining a first bucket name for the first object-based storage device; and determining a first object key for a location within the first object-based storage device.

14. The method of any one of the preceding embodiments, wherein retrieving the first token template for the remote token service further comprises: receiving a first token requirement in the first external request; and selecting the first token template from a plurality of token templates based on the first token requirement.

15. One or more non-transitory, computer-readable mediums storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

What is claimed is:

1. A system for improving security in network environments by dynamically generating access credentials off-line that are resilient to impersonation attempts, the system comprising:
one or more processors; and
one or more non-transitory, computer-readable mediums comprising instructions recorded thereon that when executed by the one or more processors cause operations comprising:
receiving, at a local token service, a first external request from a remote token service for a first dynamically generated token, wherein the local token service comprises a Kubernetes cluster;
retrieving, using a dynamic access token application programming interface at the local token service, a first token template for the remote token service;
based on the first token template, selecting, using the dynamic access token application programming interface, a first object-based storage device and a second object-based storage device, wherein the first object-based storage device and the second object-based storage device share a common object store;
transmitting, by the local token service, a first internal request to the first object-based storage device and a second internal request to the second object-based storage device;
receiving, from the first object-based storage device, a first internal response, wherein the first internal response comprises a first token portion;
receiving, from the second object-based storage device, a second internal response, wherein the second internal response comprises a second token portion;
populating, using the dynamic access token application programming interface, the first token template with the first token portion and the second token portion to generate the first dynamically generated token; and
transmitting a first external response to the remote token service comprising the first dynamically generated token.

2. A method for improving security in network environments by dynamically generating access credentials off-line that are resilient to impersonation attempts, the method comprising:
receiving, at a local token service, a first external request from a remote token service for a first dynamically generated token;
retrieving, at the local token service, a first token template for the remote token service;
based on the first token template, selecting a first object-based storage device and a second object-based storage device;
transmitting, by the local token service, a first internal request to the first object-based storage device and a second internal request to the second object-based storage device;
receiving, from the first object-based storage device, a first internal response, wherein the first internal response comprises a first token portion;
receiving, from the second object-based storage device, a second internal response, wherein the second internal response comprises a second token portion; and
populating the first token template with the first token portion and the second token portion to generate the first dynamically generated token.

3. The method of claim 2, further comprising:
receiving a second external request from the remote token service for a second dynamically generated token;
retrieving, at the local token service, a second token template for the remote token service;
based on the second token template, selecting a third object-based storage device and a fourth object-based storage device;
transmitting a second internal request to the third object-based storage device and a fourth internal request to the fourth object-based storage device;
receiving, from the third object-based storage device, a third internal response, wherein the third internal response comprises a third token portion;
receiving, from the fourth object-based storage device, a fourth internal response, wherein the fourth internal response comprises a fourth token portion; and
populating the second token template with the third token portion and the fourth token portion to generate the second dynamically generated token.

4. The method of claim 2, wherein selecting the first object-based storage device based on the first token template further comprises:
retrieving a first object-based storage device identifier for the first object-based storage device; and
inserting the first object-based storage device identifier into the first internal request.

5. The method of claim 2, wherein selecting the first object-based storage device based on the first token template further comprises:
retrieving a first job identifier for the first external request; and
inserting the first job identifier into the first internal request.

6. The method of claim 2, wherein selecting the first object-based storage device based on the first token template further comprises:
retrieving a first user identifier for the first external request; and
inserting the first user identifier into the first internal request.

7. The method of claim 2, wherein selecting the first object-based storage device based on the first token template further comprises:
retrieving a first time window for the first external request; and
inserting the first time window into the first internal request.

8. The method of claim 2, wherein selecting the first object-based storage device based on the first token template further comprises:
retrieving a first role based on the first external request; and
inserting the first role into the first internal request.

9. The method of claim 2, wherein populating the first token template with the first token portion and the second token portion to generate the first dynamically generated token further comprises:
receiving a first hash value in the first internal response, wherein the first hash value is based on hashing a first portion of the first internal request and first data located at the first object-based storage device; and
determining the first dynamically generated token based on the first hash value.

10. The method of claim 9, wherein populating the first token template with the first token portion and the second token portion to generate the first dynamically generated token further comprises:
receiving a second hash value in the second internal response, wherein the second hash value is based on hashing a second portion of the second internal request and second data located at the second object-based storage device; and
determining the first dynamically generated token based on hashing the first hash value and the second hash value.

11. The method of claim 2, wherein populating the first token template with the first token portion and the second token portion to generate the first dynamically generated token further comprises:
retrieving a token protocol from the first token template; and
combining the first token portion and the second token portion based on the token protocol.

12. The method of claim 2, wherein receiving the first internal response further comprises receiving a first contribution to a multi-party computation, and wherein receiving the second internal response further comprises receiving a second contribution to the multi-party computation.

13. The method of claim 2, wherein transmitting the first internal request to the first object-based storage device further comprises:
determining a first bucket name for the first object-based storage device; and
determining a first object key for a location within the first object-based storage device.

14. The method of claim 2, wherein retrieving the first token template for the remote token service further comprises:
receiving a first token requirement in the first external request; and
selecting the first token template from a plurality of token templates based on the first token requirement.

15. One or more non-transitory, computer-readable mediums comprising instructions recorded thereon that when executed by one or more processors cause operations comprising:
receiving, at a local token service, a first external request from a remote token service for a first dynamically generated token;
retrieving, at the local token service, a first token template for the remote token service;
based on the first token template, selecting a first object-based storage device and a second object-based storage device;
transmitting, by the local token service, a first internal request to the first object-based storage device and a second internal request to the second object-based storage device;
receiving, from the first object-based storage device, a first internal response, wherein the first internal response comprises a first token portion;
receiving, from the second object-based storage device, a second internal response, wherein the second internal response comprises a second token portion; and
populating the first token template with the first token portion and the second token portion to generate the first dynamically generated token.

16. The one or more non-transitory, computer-readable mediums of claim 15, wherein selecting the first object-based storage device based on the first token template further comprises:
retrieving a first object-based storage device identifier for the first object-based storage device; and
inserting the first object-based storage device identifier into the first internal request.

17. The one or more non-transitory, computer-readable mediums of claim 15, wherein selecting the first object-based storage device based on the first token template further comprises:
retrieving a first job identifier for the first external request; and
inserting the first job identifier into the first internal request.

18. The one or more non-transitory, computer-readable mediums of claim 15, wherein selecting the first object-based storage device based on the first token template further comprises:
retrieving a first user identifier for the first external request; and
inserting the first user identifier into the first internal request.

19. The one or more non-transitory, computer-readable mediums of claim 15, wherein selecting the first object-based storage device based on the first token template further comprises:
   retrieving a first time window for the first external request; and
   inserting the first time window into the first internal request.

20. The one or more non-transitory, computer-readable mediums of claim 15, wherein selecting the first object-based storage device based on the first token template further comprises:
   retrieving a first role based on the first external request; and
   inserting the first role into the first internal request.

* * * * *